US011188655B2

(12) United States Patent
Johar (10) Patent No.: US 11,188,655 B2
(45) Date of Patent: Nov. 30, 2021

(54) SCANNING INFORMATION TECHNOLOGY (IT) COMPONENTS FOR COMPLIANCE

(71) Applicant: EntIT Software LLC, Sunnyvale, CA (US)

(72) Inventor: Sachin Johar, Karnataka (IN)

(73) Assignee: Micro Focus LLC, Santa Clara, CA (US)

( * ) Notice: Subject to any disclaimer, the term of this patent is extended or adjusted under 35 U.S.C. 154(b) by 449 days.

(21) Appl. No.: 15/588,391

(22) Filed: May 5, 2017

(65) Prior Publication Data
US 2017/0337379 A1 Nov. 23, 2017

(30) Foreign Application Priority Data

May 18, 2016 (IN) .............................. 201641017163

(51) Int. Cl.
H04L 29/06 (2006.01)
G06F 21/57 (2013.01)
G06F 21/55 (2013.01)

(52) U.S. Cl.
CPC .......... *G06F 21/577* (2013.01); *G06F 21/552* (2013.01); *G06F 2221/034* (2013.01)

(58) Field of Classification Search
CPC . H04L 63/1416; H04L 63/145; G06F 21/552; G06F 21/566; G06F 21/577; G06F 2221/034; G06F 21/557
See application file for complete search history.

(56) References Cited

U.S. PATENT DOCUMENTS

| | | | |
|---|---|---|---|
| 8,281,019 B1 | 10/2012 | Woodard et al. | |
| 8,499,331 B1* | 7/2013 | Yehuda | H04L 41/5006 709/223 |
| 8,621,550 B1* | 12/2013 | Yehuda | G06F 21/577 726/1 |
| 8,762,508 B2 | 6/2014 | Shah et al. | |
| 9,201,713 B1* | 12/2015 | Mahadevan | G06F 9/541 |
| 9,690,933 B1* | 6/2017 | Singh | G06N 5/045 |
| 2005/0075964 A1 | 4/2005 | Quinn et al. | |
| 2005/0257267 A1* | 11/2005 | Williams | H04L 63/0227 726/25 |
| 2006/0005254 A1* | 1/2006 | Ross | H04L 63/08 726/27 |
| 2006/0059548 A1* | 3/2006 | Hildre | H04L 9/3234 726/9 |
| 2010/0251365 A1* | 9/2010 | Lyne | G06F 21/55 726/22 |

(Continued)

OTHER PUBLICATIONS

Tracy Ragan, Keeping Score in the IT Compliance Game: ALM can help organizations meet tough IT compliance requirements, Sep. 2006, ACM, vol. 4,Issue 7, pp. 38-43. (Year: 2006).*

(Continued)

*Primary Examiner* — Luu T Pham
*Assistant Examiner* — Fahimeh Mohammadi (57) ABSTRACT

Examples disclosed herein relate to scanning an IT component for compliance. In an example, events related to an IT component and past compliance scans performed on the IT component may be analyzed. Based on an analysis of the events related to the IT component and the past compliance scans performed on the IT component, a determination may be made whether a compliance scan is to be performed on the IT component.

22 Claims, 5 Drawing Sheets

(56) References Cited

U.S. PATENT DOCUMENTS

| | | | |
|---|---|---|---|
| 2011/0225275 A1* | 9/2011 | Shah | G06F 9/44505 709/223 |
| 2011/0289588 A1* | 11/2011 | Sahai | G06Q 90/00 726/25 |
| 2012/0030757 A1* | 2/2012 | Baikalov | H04L 63/1433 726/22 |
| 2012/0290544 A1* | 11/2012 | Abuelsaad | G06F 16/215 707/694 |
| 2013/0091486 A1* | 4/2013 | Gemmell | G06F 8/10 717/104 |
| 2013/0091569 A1* | 4/2013 | Baikalov | G06F 21/56 726/22 |
| 2014/0331326 A1* | 11/2014 | Thakur | H04L 63/1433 726/25 |
| 2015/0082016 A1* | 3/2015 | Bonczkowski | G06F 9/44505 713/100 |
| 2015/0143524 A1* | 5/2015 | Chestna | G06F 21/53 726/25 |
| 2017/0236078 A1* | 8/2017 | Rasumov | G06F 21/6218 705/7.28 |
| 2018/0025011 A1* | 1/2018 | Aksionkin | H04L 63/20 707/692 |
| 2018/0176254 A1* | 6/2018 | Lam | H04L 63/1408 |

OTHER PUBLICATIONS

Sherrie Drye Cannoy et al., A Framework for Health Care Information Assurance Policy and Compliance, Mar. 2010, ACM, vol. 53, Issue 3, pp. 126-131. (Year: 2010).*

Bruno de Moura Araujo et al., A method for Validating the Compliance of Business Processes to Business Rules, Mar. 2010, pp. 145-149. (Year: 2010).*

Robert Thullner et al., Proactive Business Process Compliance Monitoring with Event-Based Systems, Aug. 29-Sep. 2, 2011, IEEE, pp. 429-437. (Year: 2011).*

James, Stewart, Auditing for Policy Compliance with QualysGuard and CIS Benchmarks, SANS Institute Reading Room, Aug. 10, 2010, 42 pgs.

Rasmussen, Gideon, Cyberwar: A Threat to Business, www.techtarget.com, Feb. 2007, 9 pgs.

Trendmicro, Scan Compliance, 2015, 2 pgs.

* cited by examiner

SCANNING INFORMATION TECHNOLOGY (IT) COMPONENTS FOR COMPLIANCE

CROSS REFERENCE TO RELATED APPLICATION

This application claims the benefit of Indian Appl. No. 201641017163 filed May 18, 2016, which is hereby incorporated by reference.

BACKGROUND

Information technology (IT) infrastructures of organizations have grown over the last few decades. The number of IT components under the management of an enterprise may range from a few units to thousands of components. In addition, technologies such as virtualization and cloud computing have led to the inclusion of new kinds of IT components (for example, virtual machines) to existing IT infrastructures.

BRIEF DESCRIPTION OF THE DRAWINGS

For a better understanding of the solution, examples will now be described, purely by way of example, with reference to the accompanying drawings, in which.

DETAILED DESCRIPTION

Information technology (IT) infrastructure of organizations have grown in diversity and complexity over the years due to developments in technology. There are a variety of new computing options (for example, cloud systems and virtual servers) that were not available earlier. Such advancements have helped organizations quickly scale-up their existing IT infrastructures according to their requirements. However, it has also made the task of IT personnel who manage those infrastructures more difficult. It has become quite a challenge to monitor and manage the infrastructure components for compliance, and to ensure that system performance and availability of resources is not compromised with the growth in the infrastructure.

An approach to managing IT infrastructure components for compliance with an organization's policies may include scanning the components manually on a periodic basis. The scanning may be performed, for example, to ensure that the components are up-to-date against latest vulnerabilities (for example, viruses) and patches. In another approach, a scheduler application may be used to automate the scan process. The scheduler may scan the components on a periodic basis in order to determine their compliance status. However, scanning a large number of IT components whether manually or through a scheduled scan to ensure compliance against all defined rules may be a cumbersome and a time consuming task. It may not be an efficient way of determining whether an IT component is compliant.

To provide an example, consider a server that is scheduled for a compliance scan every day at 2 AM. Now, consider a scenario where the server may become noncompliant at 4 AM. In this case, the server may be exposed to various vulnerabilities (for example, viruses) until a scan is run on the next day at 2 AM. In a large IT infrastructure with hundreds or thousands of IT components, there's a possibility that a number of components may become noncompliant in like manner. Needless to say, this is not a desirable scenario from an enterprise's perspective.

To address such issues, the present disclosure describes various examples for scanning IT components for compliance. In an example, events related to an IT component and past compliance scans on the IT component may be analyzed. Based on the analysis, a determination may be made whether a compliance scan is to be performed on the IT component. The proposed solution provides a mechanism to identify specific IT components of an IT infrastructure for compliance scanning against noncompliant rules. Thus, instead of a "scan all for rules all" policy to scan all IT components against all defined compliance rules, the proposed solution identifies those components that may be desirable to scan for compliance against those rules that are noncompliant.

The term "information technology (IT) infrastructure" may include hardware, software, network resources, and services that may be used to develop, test, deliver, monitor, control or support IT services. Also, as used herein, the term "information technology (IT) component" may include hardware, software or a combination thereof.

Figure 1:
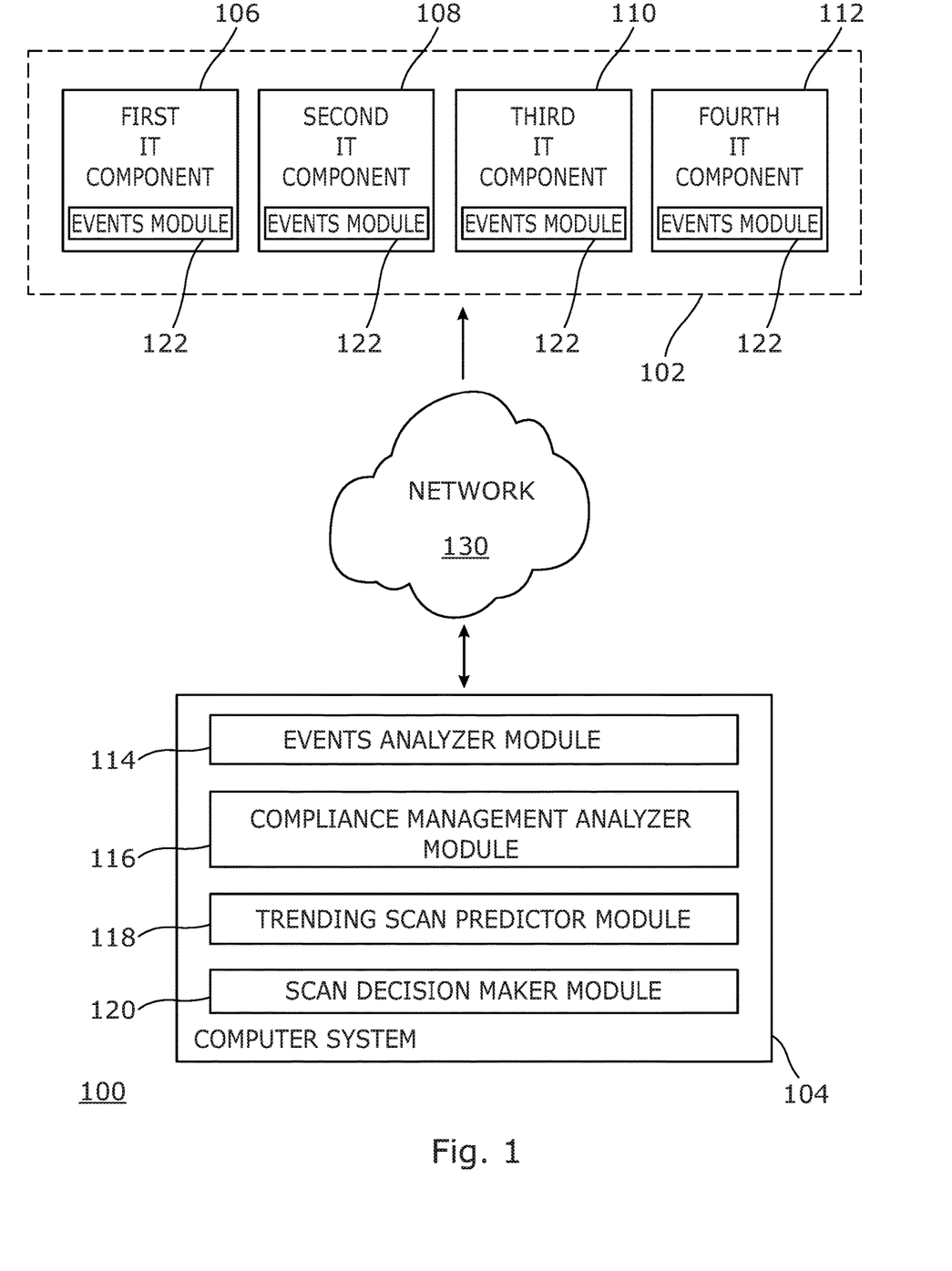
FIG. 1 is a block diagram of an example computing environment for scanning information technology (IT) components for compliance.

FIG. 1 is a block diagram of an example computing environment 100 for scanning IT components for compliance. In an example, computing environment 100 may include an information technology (IT) infrastructure 102 and a computing system 104. The information technology (IT) infrastructure 102 may include a first information technology (IT) component 106, a second information technology (IT) component 108, a third information technology (IT) component 110, and a fourth information technology (IT) component 112. Although four information technology (IT) components are shown as part of the information technology (IT) infrastructure 102 in FIG. 1, other examples of this disclosure may include more or less than four information technology (IT) components.

First IT component 106, second IT component 108, third IT component 110, and fourth IT component 112 may each be hardware, software or a combination thereof. First IT component 106, second IT component 108, third IT component 110, and fourth IT component 112 may each be, for example, a server, a printer, a router, a switch, a desktop, a laptop, a file utility, a disk drive, a computer application, and the like.

Components of the information technology (IT) infrastructure 102 i.e. first IT component 106, second IT component 108, third IT component 110, and fourth IT component 112 may be in communication, for example, via a computer network 130. Such a computer network 130 may be a wireless or wired network. Such a computer network 130 may include, for example, a Local Area Network (LAN), a Wireless Local Area Network (WAN), a Metropolitan Area Network (MAN), a Storage Area Network (SAN), a Campus Area Network (CAN), or the like. Further, such a computer network 130 may be a public network (for example, the Internet) or a private network (for example, an intranet).

In an example, information technology (IT) infrastructure 102 may represent a cloud system. The cloud system may be a private cloud, a public cloud, or a hybrid cloud. The cloud system may be used to provide or deploy various types of cloud services. These may include Infrastructure as a Service (IaaS), Platform as a Service (PaaS), Software as a Service (SaaS), and so forth. Thus, in an example, components of the information technology (IT) infrastructure 102 i.e. first IT component 106, second IT component 108, third IT component 110, and fourth IT component 112 may represent various types of cloud-based resources. These resources may be hardware resources, software resources, or any combinations thereof. The hardware resources may include, for example, computer systems, computer servers, workstations, printers, scanners, and storage devices. The software resources may include, for example, operating system software (machine executable instructions), firmware, and/or application software. In another example, the information technology (IT) infrastructure 102 may represent a data center. In such case, first IT component 106, second IT component 108, third IT component 110, and fourth IT component 112 may be components of the data center.

Computing system 104 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like. Computing system 104 may be in communication with the information technology (IT) infrastructure 102, for example, via a computer network. Such a computer network may be similar to the computer network described above. In an example, computing system 104 may be a part of the information technology (IT) infrastructure 102.

In an example, components of the information technology (IT) infrastructure 102 i.e. first IT component 106, second IT component 108, third IT component 110, and fourth IT component 112 may each include an events module 122. In an example, the computing system 104 may include an event analyzer module 114, a compliance management analyzer module 116, a trending scan predictor module 118, and a scan decision maker module 120.

The term "module" may refer to hardware, or a combination of hardware and instructions (e.g. software or firmware), such as the examples described below. A module may include, by way of example, a processor and a non-transitory machine-readable storage medium comprising machine-readable instructions or code executable by the processor to perform a functionality described herein. The processor may be any type of Central Processing Unit (CPU), microprocessor, Application Specific Integrated Circuit (ASIC), or processing logic that interprets and executes machine-readable instructions stored on the machine-readable medium. The machine-readable storage medium may be a random access memory (RAM) or another type of dynamic storage device that may store information and machine-readable instructions that may be executed by the processor. For example, machine-readable storage medium may be Synchronous DRAM (SDRAM), Double Data Rate (DDR), Rambus DRAM (RDRAM), Rambus RAM, a hard disk drive, etc. In another example, a module may include a non-transitory machine-readable storage medium comprising machine-readable instructions executable by a processor to perform a functionality described herein. In another example, the module may include hardware circuitry to perform a functionality described herein.

In an example, event analyzer module 114, compliance management analyzer module 116, trending scan predictor module 118, and scan decision maker module 120 may be part of a compliance management platform. The compliance management platform may be used to define and manage compliance rules and policies for IT components (for example, first IT component 106, second IT component 108, third IT component 110, and fourth IT component 112). The compliance management platform may be used to determine whether an IT component is compliant with a compliance rule and/or compliant policy. The compliance management platform may be used to manage IT components through a single interface. The compliance management platform may be used to automate tasks, for example, patching of IT components, running scripts on IT components, and performing a scan on IT components.

In another example, the compliance management platform may be present on a separate computing system (not shown in FIG. 1). In such case, the compliance management platform may be in communication with the information technology (IT) infrastructure 102 and computing system 104, for example, via a computer network. Such a computer network may be similar to the computer network described above.

Events module 122 may be present on each IT component (for example, 114, 116, 118, and 120) of the information technology (IT) infrastructure 102. In an example, events module may be present on those IT components of the infrastructure 102 that may be scanned for compliance against user-defined rules and policies. Events module 122 may be used to track and capture system or application-level operations and events that may be generated in an IT component (for example, 106). Events module 122 may be used to track and capture operations and events that may affect an IT component (for example, 106). For example, when a new user is created on an IT component, the newly created user setting is expected to be compliant with enterprise system user standards. Another example may include when a software or an application is installed on an IT component. In another example, if disk usage exceeds a limit, the event may be captured by events module 122.

In an example, events module 122 may include a log file that captures system or application level events. Events module 122 may communicate data related to events on an IT component to an event analyzer module (for example, 114).

Some of the example functionalities that may be performed by event analyzer module 114, compliance management analyzer module 116, trending scan predictor module 118, and scan decision maker module 120 are described in reference to FIG. 2 below.

Figure 2:
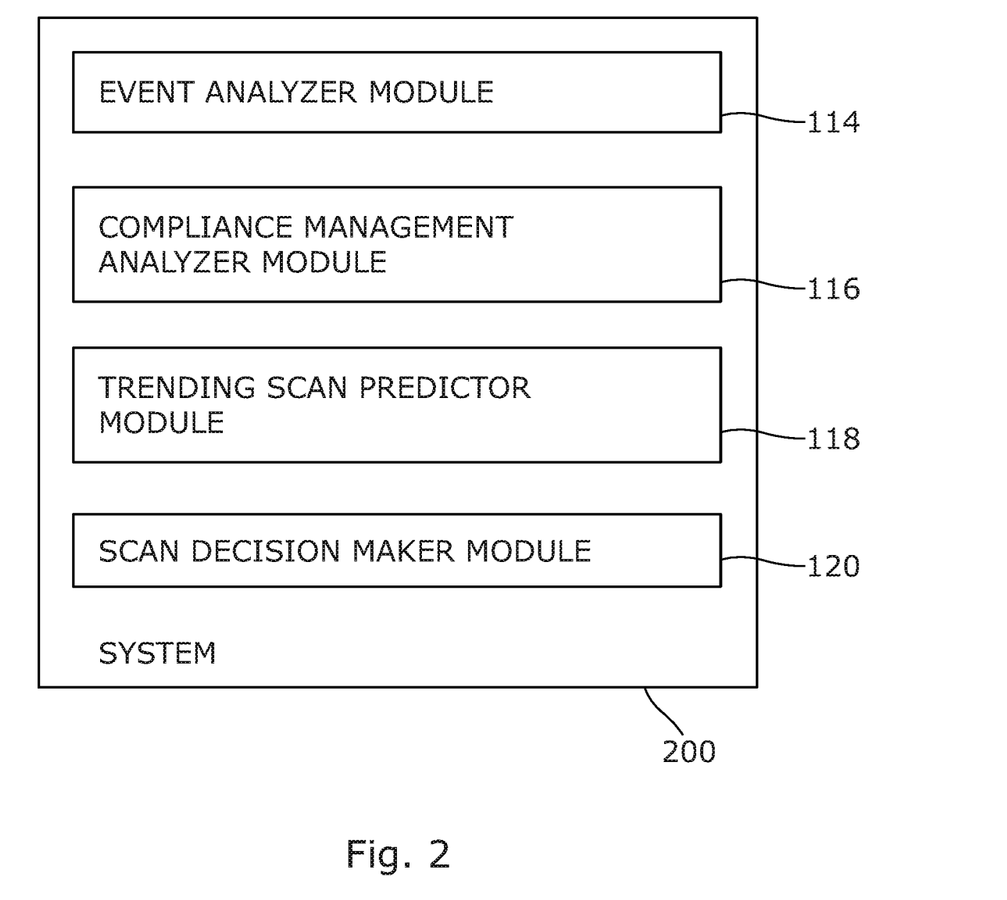
FIG. 2 is a diagram of an example computing system for scanning information technology (IT) components for compliance.

FIG. 2 is a block diagram of an example computing system 200 for scanning IT components for compliance. In an example, computing system 200 may be analogous to computing system 104 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

Computing system 200 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like.

In the example of FIG. 2, computing system 200 may include an event analyzer module 114, a compliance management analyzer module 116, a trending scan predictor module 118, and a scan decision maker module 120.

Event analyzer module 114 may receive data related to events on an IT component or impacting an IT component (for example, 106) from an events module (for example, 122). If there is a plurality of IT components with each IT component including an events module, event analyzer module 114 may receive details regarding the events related to each of the IT components from their respective events modules. Upon receipt, event analyzer module 114 may parse the data received from an IT component. The parsed data may be analyzed by event analyzer module to identify a compliance rule(s) whose compliance may be desirable on the IT component. To provide an example, when a network configuration is modified on a server, the event may be captured by an events module on the server, which may communicate the event data to event analyzer module 114. Upon receiving the data, event analyzer module 114 may identify network configurations and compliance rules whose compliance may be desirable on the IT component.

In like manner, event analyzer module 114 may parse and analyze events data generated by or related to respective IT components in a plurality of IT components to identify compliance rules for the respective IT components.

Compliance rules may address various aspects of a process (for example, business processes). For example, they may define a certain order of execution for an activity (or activities). Compliance rules may originate from different sources (for example, from various users). They could be system-defined as well. Compliance rules may include checks or constraints which are desirable to be validated on an IT component.

Event analyzer module 114 may communicate the compliance rules identified for an IT component along with information related to the IT component to compliance management analyzer 116.

Compliance management analyzer module 116 may receive or acquire the compliance rules identified for an IT component along with the information related to the IT component from event analyzer module 114. In case there is a plurality of IT components, compliance management analyzer module 116 may receive or acquire compliance rules identified for respective IT components along with information related to corresponding IT components from event analyzer module 114. Thus, for each IT component, compliance management analyzer module 116 may include information related to rules whose compliance may be desirable.

Compliance management analyzer module 116 may analyze the compliance rule(s) identified for an IT component to identify a compliance policy (or policies) corresponding to the rule(s). In like manner, in case compliance management analyzer module 116 receives or acquires rules for a plurality of IT components, compliance management analyzer module may analyze the rules related to respective IT components to identify a respective compliance policy (or policies) for the IT components. A compliance policy may include one or multiple compliance rules. For example, an enterprise may define a user management policy for its computer systems. The policy may include one or multiple compliance rules, for example, a) password for a computer system should be changed every three months; b) password should include a defined number of characters; and c) password should include one special character. In an example, in case compliance management analyzer module 116 is unable to identify a compliance policy corresponding to a compliance rule(s) identified for an IT component or if some of the identified rules of a policy are non-compliant, compliance management analyzer module 116 may analyze those compliance rule(s) and dynamically generate a compliance policy (or policies) corresponding to the rule(s).

Compliance management analyzer module 116 may communicate the compliance rule(s) and policy (or policies) identified for an IT component along with information related to the IT component to scan decision maker module 120.

Trending scan predictor module 118 may analyze previous compliance scans performed on an IT component. In case there is a plurality of IT components, trending scan predictor module 118 may analyze past compliance scans performed on each of the IT components. An IT component may undergo a number of compliance scan checks over a period of time to determine compliance against a compliance rule(s) and policy (or policies). Trending scan predictor module 118 may analyze the past scans on an IT component to identify how frequently a compliance policy is being scanned for on an IT component for compliance. For example, trending scan predictor module 118 may identify compliance rules and policies that are being scanned for more frequently (or less frequently) on the IT component.

Based on an analysis of compliance rules and policies that were previously scanned for on an IT component, trending scan predictor module 118 may determine a time period when a compliance rule or policy may be scanned for on the IT component. In case there is a plurality of IT components, trending scan predictor module 118 may determine a time period when a compliance rule or policy may be scanned for each IT component. Trending scan predictor module 118 may use machine learning algorithms (for example, Random Forest algorithm) to analyze the past compliance scans performed on an IT component. Based on the analysis, trending scan predictor module 118 may use predictive algorithms (for example, time series models) to recommend a time period for scanning an IT component for a particular compliance policy.

Trending scan predictor module 118 may communicate its analysis of past compliance scan data of an IT component to scan decision maker module 120. For example, trending scan predictor module 118 may recommend a time period for scanning an IT component for a particular compliance policy to scan decision maker module 120.

Scan decision maker module 120 may receive or acquire inputs from compliance management analyzer module 116 and trending scan predictor module 118. Scan decision maker module 120 may receive or acquire compliance rules and policies that may be scanned against an IT component along with information related to the IT component from compliance management analyzer module 116. Scan decision maker module 120 may receive or acquire inputs related to a recommended time period for scanning an IT component for a particular compliance policy from trending scan predictor 118. Based on the inputs from compliance management analyzer module 116 and trending scan predictor module 118, scan decision maker module 120 may determine whether an IT component may be scanned for compliance. Scan decision maker module 120 may further identify compliance rules and polices that may be scanned against an IT component. Scan decision maker module 120 may further determine an ideal time period for scanning an IT component for a particular compliance policy. Scan decision maker module 120 may also determine a priority for performing a scan on an IT component. In an example, scan decision maker module 120 may initiate a compliance scan on an IT component at the identified time period for determining compliance against a particular compliance policy.

In case of a plurality of IT components, scan decision maker module 120 may identify which IT components may be scanned for compliance. Scan decision maker module 120 may further identify respective compliance rules and polices that may be scanned against the identified IT components. Scan decision maker module 120 may further determine respective ideal time periods for initiating a scan on the identified IT components for a particular compliance policy. Scan decision maker module 120 may further determine respective ideal time periods for scanning the identified IT components for respective compliance policies.

In an example, scan decision maker module 120 may give more weight to inputs from compliance management analyzer module 116 as compared to inputs from trending scan predictor module 118 since compliance management analyzer module may provide an output based on an analysis of real time events as compared to an output from trending scan predictor module that may be based on previous compliance scan data.

Figure 3:
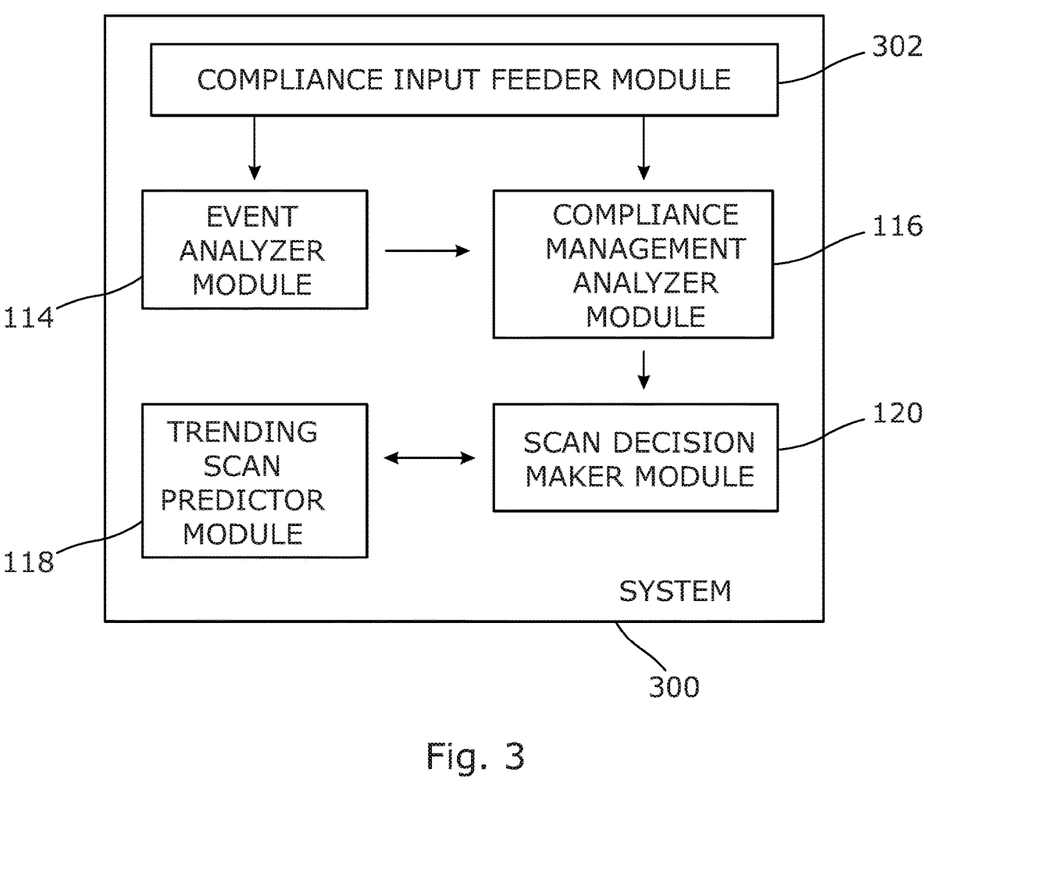
FIG. 3 is a diagram of an example computing system for scanning information technology (IT) components for compliance.

FIG. 3 is a block diagram of an example computing system 300 for scanning IT components for compliance. In an example, computing system 300 may be analogous to computing system 104 of FIG. 1 or computing system 200 of FIG. 2, in which like reference numerals correspond to the same or similar, though perhaps not identical, components. For the sake of brevity, components or reference numerals of FIG. 3 having a same or similarly described function in FIG. 1 or 2 are not being described in connection with FIG. 3. Said components or reference numerals may be considered alike.

Computing system 300 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like.

In the example of FIG. 3, computing system 300 may include an event analyzer module 114, a compliance management analyzer module 116, a trending scan predictor module 118, a scan decision maker module 120, and a compliance input feeder module 302.

Compliance input feeder module 302 may be used to define compliance rules and policies for an IT component(s). A user may define compliance rules and policies for an IT component(s) through compliance input feeder module 302. In an example, compliance input feeder module 302 may receive compliance rules and policies for an IT component(s) from a compliance management platform that was described earlier.

Compliance input feeder module 302 may provide compliance rules related to an IT component(s) to event analyzer module 114. Compliance input feeder module 302 may provide compliance rules and policies related to an IT component(s) to compliance management analyzer module 116.

Compliance input feeder module 320 may ensure that a compliance management platform is in sync with event analyzer module 114 and compliance management analyzer module 116 with regards to compliance rules and policies. For example, whenever a new policy or rule is added into the compliance management platform, it may get synced with event analyzer module 114 and compliance management analyzer module 116.

Figure 4:
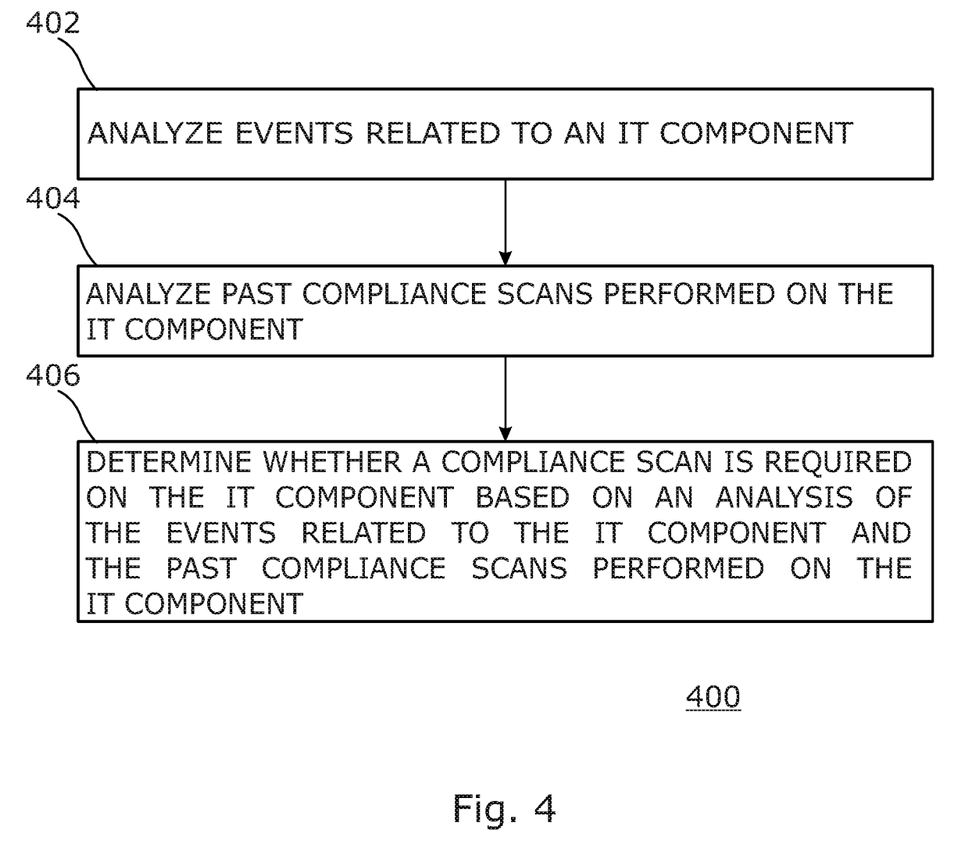
FIG. 4 is a block diagram of an example method for scanning information technology (IT) components for compliance.

FIG. 4 is a block diagram of an example method 400 for scanning IT components for compliance. The method 400, which is described below, may be partially or completely executed on a computing system such as computing system 104 of FIG. 1, computing system 200 of FIG. 2, and computing system 300 of FIG. 3. However, other suitable computing devices may execute method 400 as well. At block 402, events related to an IT component may be analyzed. At block 404, past compliance scans performed on the IT component may be analyzed. At block 406, a determination may be made whether a compliance scan is to be performed on the IT component, based on an analysis of the events related to the IT component and the past compliance scans performed on the IT component.

Figure 5:
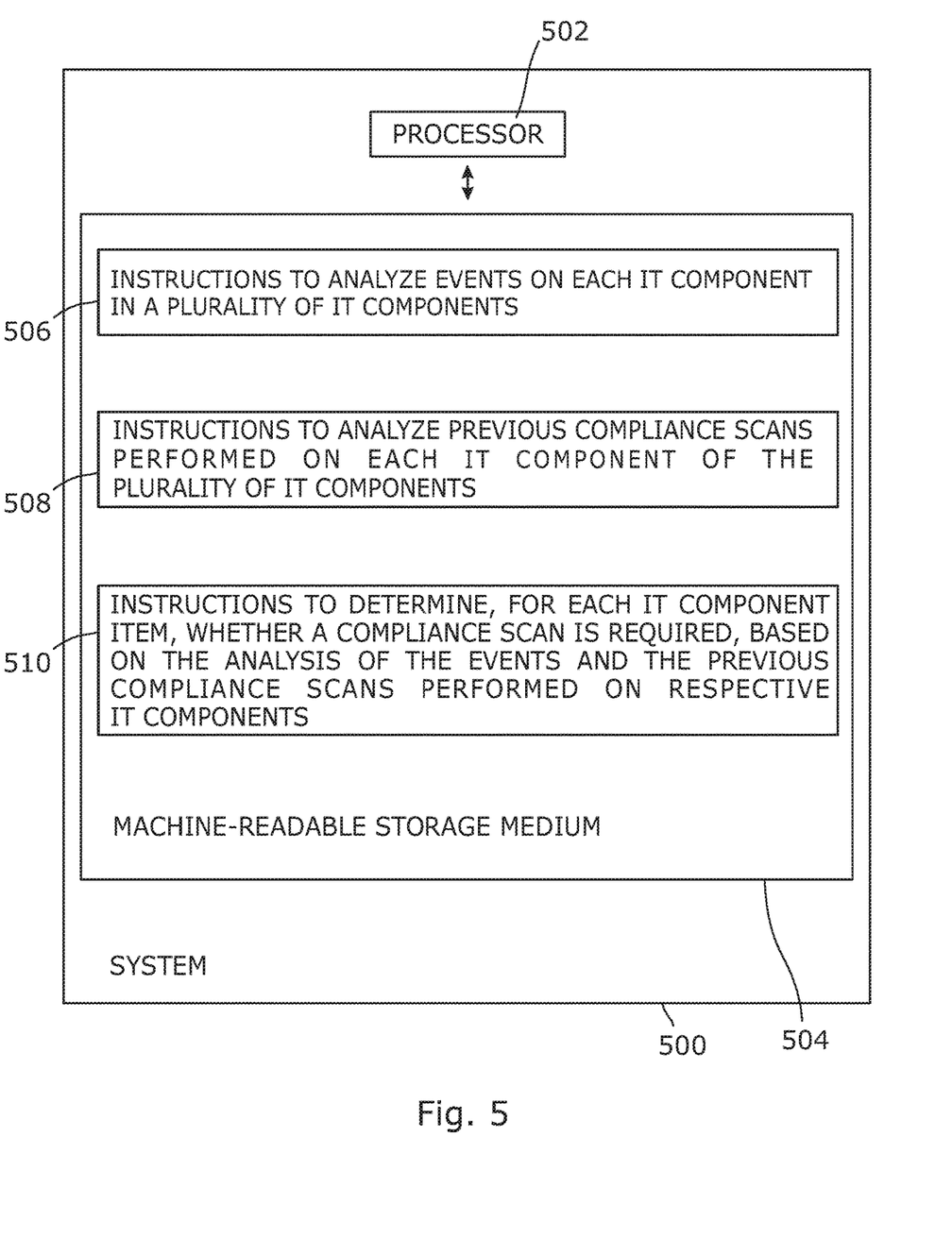
FIG. 5 is a block diagram of an example system for scanning information technology (IT) components for compliance.

FIG. 5 is a block diagram of an example system 500 for scanning IT components for compliance. System 500 includes a processor 502 and a machine-readable storage medium 504 communicatively coupled through a system bus. In an example, system 500 may be analogous to computing system 104 of FIG. 1, computing system 200 of FIG. 2, and computing system 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, and 510. In an example, instructions 506 may be executed by processor 502 to analyze events on each IT component in a plurality of IT components. Instructions 508 may be executed by processor 502 to analyze previous compliance scans performed on each IT component of the plurality of IT components. Instructions 510 may be executed by processor 502 to determine, for each IT component, whether a compliance scan is to be performed, based on the analysis of the events and the previous compliance scans performed on the respective IT components.

For the purpose of simplicity of explanation, the example method of FIG. 4 is shown as executing serially, however it is to be understood and appreciated that the present and other examples are not limited by the illustrated order. The example systems of FIGS. 1, 2, 3, and 5, and method of FIG. 4 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method performed by a system comprising a hardware processor, comprising:
   analyzing event data of events related to information technology (IT) components;
   identifying, based on the event data, compliance rules for the IT components;
   generating, based on the identifying of compliance rules for the IT components, a compliance policy that comprises the compliance rules;
   analyzing past compliance scans performed on the IT components according to the generated compliance policy;
   determining whether a compliance scan is to be performed on the IT components according to the generated compliance policy, based on the analyzing of the past compliance scans,
   wherein real time events including the generated compliance policy are weighted more than previous events including the past compliance scans when determining whether a compliance scan is to be performed on the IT components; and
   in response to determining that the compliance scan is to be performed on the IT components according to the generated compliance policy:
   determining a time period for initiating the compliance scan on the IT components according to the generated compliance policy, wherein the determining the time period is based on use of a predictive algorithm to recommend the time period, and
   initiating, at the determined time period, scanning of the IT components according to the generated compliance policy,
   wherein the compliance rules are based on validation on the IT components and
   wherein the event data includes events executed on the IT components.

2. The method of claim 1, wherein the IT components are part of a data center.

3. The method of claim 1, wherein the IT components are part of a cloud.

4. The method of claim 1, wherein the analyzing of the past compliance scans uses a machine learning algorithm, and wherein the determining of the time period based on the use of the predictive algorithm is further based on the analyzing of the past compliance scans using the machine learning algorithm.

5. The method of claim 1, wherein the time period determined based on the use of the predictive algorithm is different from a scheduled time period.

6. The method of claim 1, wherein the compliance rules included in the compliance policy comprise a rule governing a specified order of execution of activities.

7. The method of claim 1, wherein the compliance rules included in the compliance policy comprise a rule governing a characteristic of a password.

8. The method according to claim 1, wherein the event data is captured in a log file by the IT components.

9. The method according to claim 1, wherein the compliance policy is dynamically generated based on the compliance rules.

10. A system comprising:
    a processor; and
    a non-transitory storage medium storing instructions executable on the processor to:
    analyze events generated on information technology (IT) components to identify compliance rules for the IT components;
    generate, based on the identifying of the compliance rules, a compliance policy comprising the compliance rules;
    analyze previous compliance scans performed on the IT components according to the generated compliance policy; and
    determine whether the IT components are to be scanned for compliance with the generated compliance policy, based on the analysis of the previous compliance scans performed on the IT components according to the generated compliance policy,
    wherein real time events including the generated compliance policy are weighted more than previous events including the previous compliance scans when determining whether the IT components are to be scanned for compliance; and
    in response to determine that the IT components are to be scanned according to the generated compliance policy:
    determine a time period for performing the scanning of the IT components, wherein determination of the time period is based on use of a predictive algorithm to recommend the time period, and
    initiate, at the determined time period, a scan of the IT components according to the generated compliance policy,
    wherein the compliance rules are based on validation on the IT components and
    wherein the events generated on IT components include events executed on the IT components.

11. The system of claim 10, wherein the instructions are executable on the processor to determine a priority for performing the scanning of the IT components.

12. The system of claim 10, wherein the analysis of the previous compliance scans performed on the IT components according to the generated compliance policy uses a machine learning algorithm, and wherein the determination of the time period based on the use of the predictive algorithm is further based on the analysis of the previous compliance scans performed on the IT components according to the generated compliance policy using the machine learning algorithm.

13. The system of claim 10, wherein the analysis of the previous compliance scans performed on the IT components according to the generated compliance policy is based on a machine learning algorithm, and wherein the determining of the time period based on the use of the predictive algorithm is further based on the analysis of the past compliance scans performed on the IT components according to the generated compliance policy using the machine learning algorithm.

14. The system of claim 10, wherein the time period determined based on the use of the predictive algorithm is different from a scheduled time period.

15. The system of claim 10, wherein the compliance rules included in the compliance policy comprise a rule governing a specified order of execution of activities.

16. The system of claim 10, wherein the compliance rules included in the compliance policy comprise a rule governing a characteristic of a password.

17. A non-transitory machine-readable storage medium comprising instructions that upon execution cause a system to:
- analyze event data of events of a plurality of information technology (IT) components;
- identify, based on the event data, compliance rules for the plurality of IT components;
- identify, based on the compliance rules, a compliance policy that comprises the compliance rules;
- analyze previous compliance scans performed on the plurality of IT components according to the identified compliance policy;
- based on the analysis of the previous compliance scans performed on the plurality of IT components according to the identified compliance policy, determine whether a compliance scan is to be performed on the plurality of IT components according to the identified compliance policy,
- wherein real time events including the identified compliance policy are weighted more than previous events including the previous compliance scans when determining whether a compliance scan is to be performed on the plurality of IT components; and
- in response to determining that the compliance scan is to be performed on the plurality of IT components according to the identified compliance policy:
- determine a time period to initiate the compliance scan on the plurality of IT components according to the identified compliance policy and based on the analysis of the previous compliance scans performed on the plurality of IT components according to the identified compliance policy and use of a predictive algorithm to recommend the time period, and
- initiate the compliance scan on the plurality of IT components at the determined time period, to cause scanning of the plurality of IT components according to the identified compliance policy,
- wherein the compliance rules are based on validation on the IT components and
- wherein the event data includes events executed on the IT components.

18. The non-transitory machine-readable storage medium of claim 17, wherein the plurality of IT components are part of a cloud system.

19. The non-transitory machine-readable storage medium of claim 17, wherein the analysis of the previous compliance scans performed on the plurality of IT components according to the identified compliance policy is based on a machine learning algorithm.

20. The non-transitory machine-readable storage medium of claim 17, wherein the time period determined based on the use of the predictive algorithm is different from a scheduled time period.

21. The non-transitory machine-readable storage medium of claim 17, wherein the compliance rules included in the compliance policy comprise a rule governing a specified order of execution of activities.

22. The non-transitory machine-readable storage medium of claim 17, wherein the compliance rules included in the compliance policy comprise a rule governing a characteristic of a password.

\* \* \* \* \*